UNITED STATES PATENT OFFICE.

LAWRENCE V. REDMAN, OF LAWRENCE, KANSAS, ASSIGNOR TO REDMANOL CHEMICAL PRODUCTS COMPANY, OF CHICAGO, ILLINOIS, A CORPORATION OF WEST VIRGINIA.

PLASTIC COMPOSITION AND PROCESS OF MAKING SAME.

1,209,333.  Specification of Letters Patent.  Patented Dec. 19, 1916.

No Drawing.  Application filed April 4, 1912. Serial No. 688,474.

*To all whom it may concern:*

Be it known that I, LAWRENCE V. REDMAN, a citizen of the United States, residing at Lawrence, in the county of Douglas and State of Kansas, have invented a new and useful Improvement in Plastic Composition and Processes of Making Same, of which the following is a specification.

This invention relates particularly to a composition of matter and process of producing the same; and the primary object of the invention is to provide a new composition of matter adapted to various uses.

In one form the new composition of matter is adapted to serve as an improved lacquer or varnish which can be applied to serve as a preservative for the surfaces of wood, metal, and other materials; and the new composition of matter is also adapted to serve as a binder, or as a glue, or other adhesive.

The new substance may be used advantageously as a binder for abrasive materials, such as carborundum or aluminum oxid. Also, it may be employed in the manufacture of artificial wood, as where the material is mixed with sawdust or wood fiber and pressed into any desired form. Again, the material may have mixed therewith a pigment, sand or other neutral material and in this condition may be used for coating or painting purposes. Various other uses are contemplated.

In its final stage the new product is insoluble in any of the solvents so known, such as acetone, amyl-acetate, nitrobenzene, ethyl-alcohol, wood spirits, etc.; also, in the same stage, the product is highly or quite resistive to the action of acids or alkalis. In fact, the substance is more resistant to the action of acids and alkalis than is any known substance which is adapted to the purposes of the new composition.

In its final stage the substance may be employed advantageously for insulation purposes, as an artificial amber for many purposes, may be used for making buttons, and also may be used for making molding blocks or dies for many purposes where such material is desirable.

The new composition of matter is preferably compounded or produced by mixing a quantity of a phenolic body, a lesser quantity of hexamethylenetetramin, and a quantity of anisol approximately the same number of formula weights as that of the hexamethylenetetramin, and subjecting the same to a heating process, which results in the elimination of ammonia and in the production of a compound having an alkylated hydroxyl group in its molecule and possessing the ether characteristic of great resistance to decomposition.

In carrying out the improved process, it is preferred to employ the following proportions of materials and steps, that is to say: Take six formula weights, or molecular weights, of a phenolic body, such as carbolic acid ($C_6H_5OH$); one formula weight, or molecular weight, of hexamethylenetetramin (($CH_2$)$_6N_4$); one formula weight, or molecular weight, anisol ($C_6H_5OCH_3$); subject the mixture to the action of heat at a temperature of from 100° C. to 140° C. for, say, from fifteen minutes to several hours, depending upon the quantity of materials being treated and the temperature. This may be done in an open vessel, and as the application of heat continues, ammonia is given off. Under this method of treatment, the mixture soon changes its condition to a yellowish transparent mobile liquid, which finally becomes viscous and solidifies on cooling. The product thus obtained is soluble in certain solvents, such as acetone and others named above, or mixtures of the same, and when thus dissolved the material may be used as a varnish. After being applied in a thin coating and allowed to stand for some time, it changes its characteristics and becomes much less soluble in the solvents so known. When applied to surfaces of metals the metals may be heated to dry the coating and increase the insolubility.

If desired, alcohol, or other solvents, may be placed in the mixture before the heating takes place, and the alcohol thus employed will serve as a solvent for the product. This course may be particularly desirable where a very thin varnish is desired. Ordinary denatured alcohol will serve the purpose. Where the alcohol is introduced before the heating it will serve to control the reaction by regulating the temperature. Where the heating is performed in the absence of a solvent, a metal object, for instance, may be immersed while the liquid is in a very fluid condition, and the surfaces may thus be coated or lacquered, and afterward dried to harden the coatings; or the lacquering or coating may be performed while the substance is in a dissolved state, and the object then subjected to a baking operation. Where desired, the mixture may be heated in the absence of a solvent; and after the material has passed to the viscous stage, the heat may be increased to a temperature of, say, 180° C. and continued for a time, when the material will pass to the final stage, in which condition it is an amorphous mass, hard, highly resilient, of high tenacity, insoluble in the known solvents and in ordinary acids and alkalis, and chemically and physically inert to a high degree.

In its final stage the material is a most excellent non-conductor of both electricity and heat. The length of time required to convert the material to the final stage depends upon the quantity of material treated and the degree of heat applied. During the first heat treatment, ammonia is given off in very appreciable quantities; and at the end of the first heat treatment, if the material be allowed to become solid, it possesses a clear light yellowish color and is brittle and transparent. The color may be varied by varying the treatment, e. g., the length of time of heating, degree of heating, and proportion of ingredients. Thus, an excess of hexamethylenetetramin produces a lighter colored product; an excess of phenol produces a product of darker color; and an excess of anisol causes the product to be transformed more rapidly and produces a lighter color. In converting the material to the final insoluble stage, the lower the degree of heat applied the longer the period required to effect the conversion. When it is desired to produce a molded block or object composed of the new product, this may be accomplished by taking approximately 80 per cent. of the insoluble material in mass and approximately 20 per cent. of the soluble material in mass, grinding the same together, then placing the powdered material in a hot mold, pressing the same into approximately the desired shape, then reheating the mass to a plastic condition, and then pressing in the mold to the final shape. The degree of heat applied in this operation should ordinarily be sufficient to convert that portion of the material which is taken in the soluble state to the insoluble state.

When the materials employed in producing the new composition of matter are carbolic acid, hexamethylenetetramin and anisol in approximately the proportions mentioned above, the product, in its final stage, may be represented by the formula $$C_6H_5OCH_2—(C_6H_4OCH_2)_n—C_6H_4OCH_3.$$

Thus it will be noted that the substance is an ether and that the final hydroxyl hydrogen of the phenol is replaced by a methyl group. In other words, the chemical formula is terminated at one end by a non-reactive group, which in the illustration given is a methyl group. Thus, because of the non-reactivity of the final group, the molecule cannot form an anhydrid or an inner anhydrid with itself, or a lactone substance. It follows from the materials used and the steps followed that no water is produced in the reaction; and it may be added that water is not employed in the mixture at the outset, except as it may be present in comparatively small quantities as an impurity. The reaction is thus anhydrous in character and is carried on practically in the absence of water.

In place of the anisol any suitable material may be employed which has its hydroxyl hydrogen of the phenol group replaced by a non-reactive group or radical. Otherwise stated, for anisol may be substituted any hydroxylated aromatic derivative, which has had its hydroxyl radical, or the hydrogen thereof, replaced by a non-reactive element or group. Such a derivative may be designated as an aromatic derivative having the general formula R—X, where R represents an aromatic radical and X a non-reactive element or group. Where the hydrogen only of the hydroxyl group is replaced, the oxygen remaining in the derivative, the general formula R—X and the more specific formula R—O—X are equally applicable. In explanation, it may be pointed out that anisol is a phenol having its hydroxyl hydrogen replaced by a methyl group. Thus, anisol may be produced by the reaction between sodium phenolate ($C_6H_5ONa$) and methyl monochlorid ($CH_3Cl.$). Anisol is a commercial substance, but may be produced in the manner indicated.

From the foregoing it will be understood that one may employ, in place of anisol, which is an ether, methyl benzoat ($C_6H_5COOCH_3$), which is an ester; or phenylmethyl ketone ($C_6H_5.CO.CH_3$)—that is, a ketone. Other instances of ethers which may be used are phenetol ($C_6H_5OC_2H_5$) and diphenyloxid ($C_6H_5OC_6H_5$); and other instances might be mentioned. If, for the anisol, one were to substitute a substance less reactive, such as benzene, it would be necessary to carry on the process under pressure.

While it is preferred to employ carbolic acid, one may employ a homologue, such as cresol ($CH_3C_6H_4OH$), or other phenolic body which expression is to be understood as including any suitable hydroxy-aromatic compound. It is to be noted, however, that I produce a direct reaction between hexamethylenetetramin, or its equivalent, anisol, or its equivalent, and a phenol in uncombined condition; and as I obviate many difficulties incident to any process which produces a resin by combining formaldehyde with a phenol, I do not desire to be understood as intending, by the expression "hydroxy aromatic compound" or "phenolic body", to include a resin which is a condensation product of formaldehyde and a phenol, and which, therefore, is not a phenolic body, but merely the condensation product of a process which my invention renders unnecessary and the objections incident to which are obviated by my invention. By a single simple process I am able to obtain the advantageous results set forth herein.

As a substitute for hexamethylenetetramin one may employ hydrobenzamid $(C_6H_5CH)_3N_2$, which is a solid and which may be used in place of the solid hexamethylenetetramin by substantially the same process described above. In fact, one may employ in lieu of the hexamethylenetetramin any compound containing methylene, which is readily dissociated in order that the methylene group thereof may enter into the new composition. The appended claims may be understood, therefore, where the term "hexamethylenetetramin" is employed, as including any equivalent for this substance which will produce the desired result. At the same time, it is noted that the process is exceedingly simple and direct and free from many objections where the hexamethylenetetramin itself is employed as a solid constituent of the mixture, or an equivalent solid substance is employed, one important object being to keep the mixture as free from water as possible.

It should be explained that where a ketone is employed in lieu of the anisol, the whole hydroxyl radical of this aromatic derivative has been replaced by a non-reactive group; that is, both the oxygen and hydrogen of the hydroxyl have been replaced by the group $COCH_3$. It is to be understood, therefore, that in the appended claims, wherever is specified a substance in which hydroxyl hydrogen is replaced by a non-reactive group, this expression should include all substitutes of a cyclic nature (that is, ring compounds), but having the hydroxyl hydrogen, or the hydroxyl group replaced by an inactive group, e. g. by hydrogen itself, a keto group, an ester group, etc., so that substances such as esters, ketones, and inactive substitution products of benzene are to be included.

The proportions of the ingredients may be varied; but, if the proportion of the phenolic body is greatly decreased, the condensation product becomes brittle and less desirable from a commercial standpoint, as well as more expensive, so that it is impracticable to reduce the proportion of the phenolic body to less than two formula weights of the phenolic body to one formula weight of each of the other substances.

The foregoing detailed description has been given for clearness of understanding only, and no undue limitation should be understood therefrom, but the appended claims should be construed as broadly as permissible in view of the prior art.

What I regard as new, and desire to secure by Letters Patent, is—

1. An amorphous condensation product of a phenolic body, an active methylene body, and a derivative of a hydroxylated aromatic compound having the general formula R—X, where R represents an aromatic radical and X a non-reactive element or group.

2. An amorphous condensation product of a phenolic body, a methylene-amin body in the form of a solid and in lesser proportion, and a derivative of a hydroxylated aromatic compound having the general formula R—X, where R represents an aromatic radical and X a non-reactive element or group.

3. An amorphous condensation product of a hydroxy aromatic compound, an active methylene body containing nitrogen, and a derivative of a hydroxylated aromatic compound having the general formula R—X, where R represents an aromatic radical and X a non-reactive element or group after subjection to the action of heat and the elimination of nitrogen in the form of ammonia.

4. An amorphous condensation substance comprising the condensation product of a substantially anhydrous reaction between a phenolic body, an active methylene body, and a derivative of a hydroxylated aromatic compound having the general formula R—X, where R represents an aromatic radical and X a non-reactive element or group, such reaction carried on substantially in the absence of water.

5. An amorphous condensation product of a phenolic body, hexamethylenetetramin in solid form, and a derivative of a hydroxylated aromatic compound having the general formula R—X, where R represents an aromatic radical and X a non-reactive element or group.

6. An amorphous condensation product of a phenolic body, an active methylene body, and a derivative of a hydroxylated aromatic compound, after subjection to the action of heat for a period of time at moderate temperature approximating 140° C., and after subjection to a higher degree of heat approximating 180° C.

7. An amorphous condensation product of a phenolic body, an active methylene body, and anisol.

8. An amorphous condensation product of a phenolic body, hexamethylenetetramin in solid form, and anisol.

9. An amorphous condensation product of a phenolic body, hexamethylenetetramin, and a derivative of a hydroxylated aromatic compound having the formula R—O—X, where R represents an aromatic radical, O represents oxygen, and X a non-reactive element or group, compounded in approximately the proportions of six molecular weights of the phenol body, one molecular weight of hexamethylenetetramin and one formula weight of the third named substance.

10. An amorphous condensation product of an active methylene body, a derivative of a hydroxylated aromatic compound having the general formula R—X, where R represents an aromatic radical and X a non-reactive element or group, and a phenolic body, combined in the proportion of more than twice the number of molecular weights of the phenolic body, to the number of molecular weights of either of the first two substances mentioned.

11. The process of producing a condensation product, consisting of mixing a phenolic body, a methylene-amin body and a derivative of a hydroxylated aromatic compound having the general formula R—X, where R represents an aromatic radical and X a non-reactive element or group, and subjecting the same to the action of heat at a comparatively moderate temperature, the heat treatment being continued until a homogeneous soluble substance is produced.

12. The process of producing a condensation product consisting in mixing a phenolic body, an active methylene body in smaller proportions, and a derivative of a hydroxylated aromatic compound having the general formula R—X, where R represents an aromatic radical and X a non-reactive element or group, the last named substance in smaller proportion than the first-named substance, and subjecting the mixture to the action of heat at a moderate temperature approximating 140° C., and thereafter subjecting the resultant mass to a higher temperature approximating 180° C., the treatment at the higher temperature continuing until the mass becomes hard and insoluble.

13. The process of producing a condensation product, consisting in mixing a phenolic body, an active methylene body in the form of a solid containing nitrogen and taken in lesser proportion, and a derivative of a hydroxylated aromatic compound having the general formula R—X, where R represents an aromatic radical and X a non-reactive element or group, the last-named substance in smaller proportion than the first-named substance, and subjecting the mixture to heat treatment to eliminate nitrogen in the form of ammonia and produce a homogeneous compound.

14. The process of producing a condensation product which consists in mixing a phenolic body, an active methylene body in solid form containing nitrogen, and anisol, the second and third named substances being used in considerably smaller proportions than the first-named substance, and subjecting the mixture to heat treatment to eliminate nitrogen in the form of ammonia and produce a homogeneous compound.

15. The process of producing a condensation product consisting in mixing a phenolic body, a methylene-amin body and a derivative of a hydroxylated aromatic compound having the general formula R—X, where R represents an aromatic radical and X a non-reactive element or group, the second and third named substances being taken in smaller proportions than the first-named substance, subjecting the mixture to the action of heat and adding a solvent as a step in the process.

16. The process of producing a condensation product consisting in mixing a phenolic body, an active methylene body in solid form, and anisol, subjecting the mixture to the action of heat, and adding a solvent as a step in the process.

17. The method of producing a condensation product, consisting in mixing a phenolic body, hexamethylenetetramin, and anisol in the approximate proportions of six molecular weights of the phenolic body, one molecular weight of the hexamethylenetetramin, and one molecular weight of the anisol, and subjecting the mixture to the action of heat to eliminate nitrogen in the form of ammonia and produce a homogeneous compound.

18. The process of producing a condensation product consisting in mixing a phenolic body which is not a condensation product, an active methylene body, and a derivative of a hydroxylated aromatic compound having the general formula R—X, where R represents an aromatic radical and X a non-reactive element or group, and subjecting the mixture to the action of heat while the mixture is exposed to the atmosphere.

19. The process of producing a phenolic condensation product consisting of mixing a phenolic body, hexamethylenetetramin, and a compound having an alkalated hydroxyl group in its molecule, the last two substances being in substantially equal proportions and the phenolic body being in much larger proportion than the other ingredients, introducing a solvent which acts also as a reaction-controlling agent, and subjecting the whole to the action of heat.

20. The method of producing a phenolic condensation product consisting in mixing a phenolic body, a methylene-amin body, and a derivative of a hydroxylated aromatic compound having the general formula R—X, the second and third named substances being taken in proportion of about one-sixth of the phenolic body, and heating said mixture to cause anhydrous reaction substantially in the absence of water, where R represents an aromatic radical and X a non-reactive element or group.

21. The process of producing a condensation product consisting of mixing a hydroxy aromatic compound, an active methylene body, and a derivative of a hydroxylated aromatic compound having the general formula R—X, where R represents an aromatic radical and X a non-reactive element or group, and subjecting the same, in the absence of water, to the action of heat at a comparatively moderate temperature, the heat treatment being continued until a homogeneous soluble substance is produced.

22. The process of producing a condensation product consisting of mixing a phenolic body, an active methylene body in considerably smaller proportion, and a derivative of a hydroxylated aromatic compound having the general formula R—X, where R represents an aromatic radical and X a non-reactive element or group, and then in considerably smaller proportion than the phenolic body, and subjecting the same to the action of heat until a homogeneous soluble substance is produced.

LAWRENCE V. REDMAN.

In presence of—
R. A. RAYMOND,
J. G. ANDERSON.